US010895855B2

(12) United States Patent
Kelly et al.

(10) Patent No.: US 10,895,855 B2
(45) Date of Patent: Jan. 19, 2021

(54) CONTROLLING DEVICES USING A RICH REPRESENTATION OF THEIR ENVIRONMENT

(71) Applicant: Microsoft Technology Licensing, LLC, Redmond, WA (US)

(72) Inventors: Conor Edmund Kelly, Bothell, WA (US); Om Prakash Ravi, Sammamish, WA (US); Supradha Sankaran, Redmond, WA (US); Alina Mihaela Stanciu, Redmond, WA (US); Stanislaw Wiktor Swierc, Redmond, WA (US); Hubert Van Hoof, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 16/138,822

(22) Filed: Sep. 21, 2018

(65) Prior Publication Data

US 2020/0096958 A1    Mar. 26, 2020

(51) Int. Cl.
*G05B 13/04*   (2006.01)
*G05B 13/02*   (2006.01)
*H02J 3/00*    (2006.01)

(52) U.S. Cl.
CPC ....... *G05B 13/048* (2013.01); *G05B 13/0265* (2013.01); *H02J 3/00* (2013.01); *H02J 3/003* (2020.01); *H02J 2203/20* (2020.01)

(58) Field of Classification Search
CPC ..... G05B 13/048; G05B 13/0265; H02J 3/00; H02J 2003/003; H02J 2003/007
See application file for complete search history.

(56) References Cited

U.S. PATENT DOCUMENTS

| 7,730,364 B2 | 6/2010 | Chang et al. |
| 8,751,421 B2 | 6/2014 | Anderson et al. |
| 2007/0203768 A1 | 8/2007 | Adra |

(Continued)

OTHER PUBLICATIONS

Search Report and Written Opinion in PCT/US2019/038861, dated Aug. 27, 2019, 13 pages.

(Continued)

*Primary Examiner* — Chad G Erdman

(57) ABSTRACT

A technique is described herein for using computing technology to intelligently manage the consumption of a resource in a physical environment and/or controlling the physical environment in other ways. The technique maintains environment information that describes entities within the physical environment, together with the relationships among the entities. The technique leverages the environment information and collected sensor data to generate forecast data using one or more machine-trained models. The technique then leverages the environment information, sensor data, and forecast data to generate a control plan. The control plan provides a strategy for controlling the physical environment that satisfies a specified optimization objective. In one use case, the technique contributes to the efficient consumption of power provided by a distribution system by avoiding consumption of power in periods in which the distribution system is expected to experience high loads.

20 Claims, 9 Drawing Sheets

(56) References Cited

U.S. PATENT DOCUMENTS

| | | | | |
|---|---|---|---|---|
| 2009/0204267 | A1* | 8/2009 | Sustaeta | G05B 13/0285 700/291 |
| 2013/0151012 | A1* | 6/2013 | Shetty | G05D 23/1923 700/276 |
| 2014/0297001 | A1* | 10/2014 | Silverman | G05B 15/02 700/19 |
| 2017/0288401 | A1* | 10/2017 | Hummon | G05B 15/02 |
| 2018/0356780 | A1* | 12/2018 | Halabieh | G06Q 50/06 |
| 2019/0079473 | A1* | 3/2019 | Kumar | G05B 13/048 |

OTHER PUBLICATIONS

Mannel, Bill, "Reducing Machine Failure and Downtime with Pattern Recognition and AI," available at <<https://community.hpe.com/t5/Servers-The-Right-Compute/Reducing-Machine-Failure-and-Downtime-with-Pattern-Recognition/ba-p/6980443#.WtBoQC5uZQJ>>, Hewlett Packard Enterprise Community, HP Inc., Palo Alto, CA, Oct. 17, 2017, 8 pages.

Irwin, Richard, "Predictive Maintenance and Machine Learning: Revolutionizing Reliability," available at <<https://reliabilityweb.com/articles/entry/predictive-maintenance-and-machine-learning-revolutionizing-reliability>>, Reliabilityweb.com, accessed on Aug. 10, 2018, 10 pages.

Coleman, et al., "Making maintenance smarter: Predictive maintenance and the digital supply network," available at <<https://www2.deloitte.com/insights/us/en/focus/industry-4-0/using-predictive-technologies-for-asset-maintenance.html>>, Deloitte Insights, Deloitte Development LLC, 24 pages.

Gillen, Stuart, "Minimize Costs Through Machine Learning," available at <<https://reliabilityweb.com/articles/entry/minimize-costs-through-machine-learning>>, Reliabilityweb.com, accessed on Aug. 10, 2018, 8 pages.

"Predictive Maintenance with Data Science and Machine Learning," available at <<https://web.archive.org/web/20170325205559/https://www.softwebsolutions.com/predictive-maintenance-with-data-science-and-machine-learning/>>, Software Solutions, accessed on Sep. 10, 2018, 5 pages.

Tran, et al., "Manufacturing Downtime Cost Reduction with Predictive Maintenance," available at <<https://arimo.com/machine-learning/2016/manufacturing-downtime-cost-reduction-predictive-maintenance/>>, Arimo.com blog, Mountain View, CA, accessed on Aug. 10, 2018, 10 pages.

Forrest, et al., "CBC User Guide," in Tutorials in Operations Research, Informs, 2005, 21 pages.

"Pyomo," available at <<https://en.wikipedia.org/wiki/Pyomo>>, Wikipedia article, accessed on Sep. 4, 2018, 2 pages.

"Integer programming," available at <<https://en.wikipedia.org/wiki/Integer_programming>>, Wikipedia article, accessed on Sep. 1, 2018, 6 pages.

"Microsoft Azure IoT Reference Architecture," available at <<http://download.microsoft.com/download/A/4/D/A4DAD253-BC21-41D3-B9D9-87D2AE6F0719/Microsoft_Azure_IoT_Reference_Architecture.pdf>>, Version 2.0, Microsoft Corporation, Redmond, WA, accessed on Sep. 13, 2018, 61 pages.

Neupane, et al., "Utilizing Device-level Demand Forecasting for Flexibility Markets," in arXiv:1805.00702v1 [cs.CE], May 2, 2018, 13 pages.

Valsomatzis, et al., "Day-ahead Trading of Aggregated Energy Flexibility," in arXiv:1805.02301v3 [cs.CE], May 24, 2018, 10 pages.

"Local Flexibility Markets (electricity)," available at <<https://en.wikipedia.org/wiki/Local_Flexibility_Markets_(electricity)>>, Wikipedia article, accessed on Sep. 2, 2018, 5 pages.

"Automated machine learning," available at <<https://en.wikipedia.org/wiki/Automated_machine_learning>>, Wikipedia article, accessed on Sep. 1, 2018, 3 pages.

Van Hoof, et al., "Methods and Systems for Managing Physical Spaces, Associated Devices, and Users," U.S. Appl. No. 15/964,623, filed Apr. 27, 2018, 45 pages.

\* cited by examiner

OVERVIEW OF OPERATION OF THE CONTROL SYSTEM 802

STORE ENVIRONMENT INFORMATION IN ONE OR MORE DATA STORES THAT DESCRIBES A PHYSICAL ENVIRONMENT TO BE CONTROLLED, THE ENVIRONMENT INFORMATION INCLUDING: FIRST INFORMATION WHICH DESCRIBES ENTITIES ASSOCIATED WITH THE PHYSICAL ENVIRONMENT, THE ENTITIES INCLUDING AT LEAST: ONE OR MORE PHYSICAL SPACES; ONE OR MORE DEVICES; ONE OR MORE SENSORS; AND ONE OR MORE PEOPLE WHO INTERACT WITH THE PHYSICAL ENVIRONMENT; AND SECOND INFORMATION WHICH DESCRIBES RELATIONS AMONG THE ENTITIES IN THE PHYSICAL ENVIRONMENT;
804

RECEIVE SENSOR DATA FROM ONE OR MORE SENSORS PROVIDED BY THE PHYSICAL ENVIRONMENT, THE SENSOR DATA DESCRIBING STATES ASSOCIATED WITH AT LEAST SOME OF THE PHYSICAL ENTITIES IN THE ENVIRONMENT.
806

GENERATE FORECAST DATA, USING AT LEAST ONE MACHINE-TRAINED MODEL, THAT DESCRIBES A FUTURE STATE OF AT LEAST ONE ASPECT OF THE PHYSICAL ENVIRONMENT, THE GENERATING OF FORECAST DATA BEING BASED AT LEAST ON: THE ENVIRONMENT INFORMATION; AND THE SENSOR DATA.
808

GENERATE A CONTROL PLAN THAT PROVIDES A STRATEGY FOR CONTROLLING OPERATION OF THE DEVICES AND/OR OTHER ENTITIES IN THE PHYSICAL ENVIRONMENT THAT SATISFIES A SPECIFIED OPTIMIZATION OBJECTIVE, WITHIN A SPECIFIED SPAN OF TIME, THE GENERATING OF A CONTROL PLAN BEING BASED AT LEAST ON: A CONSTRAINT FILE THAT DESCRIBES CONSTRAINTS ASSOCIATED WITH THE PHYSICAL ENVIRONMENT; AN OBJECTIVE FUNCTION THAT DESCRIBES THE OPTIMIZATION OBJECTIVE; THE SENSOR DATA; AND THE FORECAST DATA.
810

OVERVIEW OF OPERATION OF THE CONTROL SYSTEM 802, CONTINUED

CONT. FROM FIG. 8

OPTIONALLY, SUBMIT PROPOSAL INFORMATION TO A RESOURCE-PROVIDING SYSTEM THAT DESCRIBES THE CONTROL PLAN.
902

OPTIONALLY, RECEIVE REPLY INFORMATION FROM THE RESOURCE-PROVIDING SYSTEM IN RESPONSE TO THE PROPOSAL INFORMATION.
904

SEND INSTRUCTIONS TO THE PHYSICAL ENVIRONMENT WHEN THE REPLY INFORMATION INDICATES THAT THE RESOURCE-PROVIDING SYSTEM HAS APPROVED THE PROPOSAL INFORMATION, THE INSTRUCTIONS FOR USE IN CONTROLLING THE DEVICES AND/OR OTHER ENTITIES BASED ON THE CONTROL PLAN, E.G., BY CONTROLLING CONSUMPTION OF A RESOURCE IN THE PHYSICAL ENVIRONMENT.
906

FIG. 9

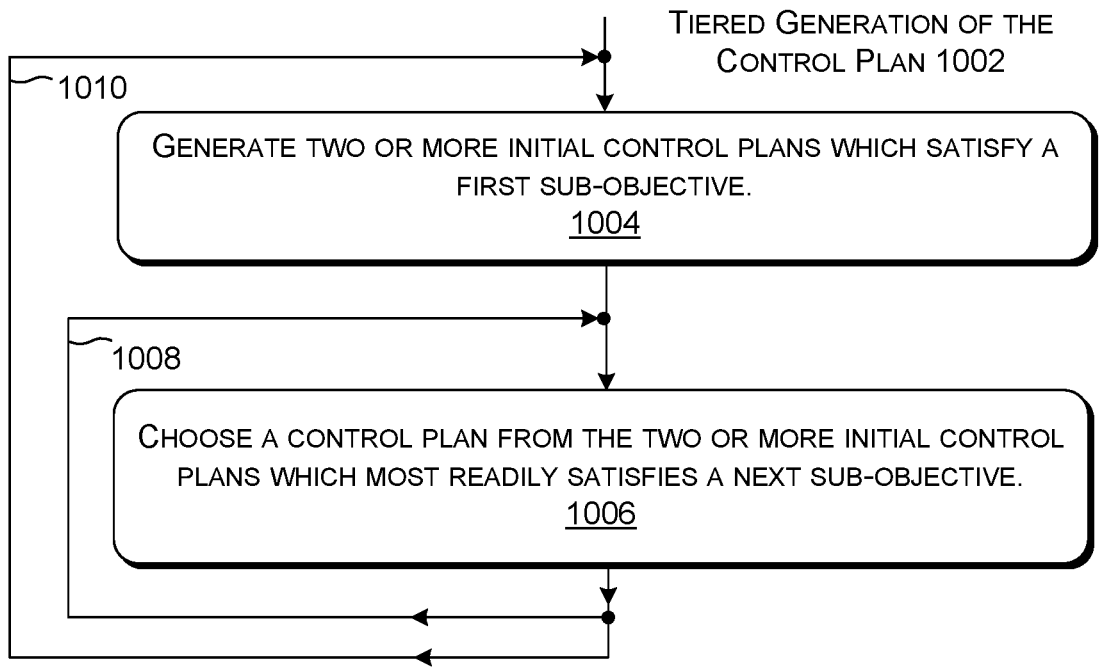

FIG. 10

CONTROLLING DEVICES USING A RICH REPRESENTATION OF THEIR ENVIRONMENT

BACKGROUND

The industry has developed various kinds of computer-implemented strategies to manage the consumption of resources (such as electric power) in an environment of interest. A typical approach in this regard is to narrowly model a single machine or process using custom logic, such as a custom set of equations or rules. This approach then uses a computing device to control the machine or process based on this custom logic. This approach is not fully satisfactory. For instance, the task of modeling a machine or process using custom logic requires a skilled analyst; even then, this task is labor-intensive in nature. Further, the approach may fail to provide logic which adequately accounts for the complexity of the machine or process. Finally, the approach requires labor-intensive updating of the logic when any aspect of the underlying machine or process is changed, or when the underlying machine or process is used in a new context.

SUMMARY

A technique is described herein for using computing technology to intelligently manage devices and other entities in a physical environment, such as by controlling the consumption of a resource (such as electric power) by the devices. The technique maintains environment information which describes various entities within the physical environment (such as the spaces, devices, and people present in a building), together with the relationships among the entities. The technique also receives sensor data from sensors dispersed throughout the physical environment. The sensor data reflects the current states of various entities in the physical environment. The technique leverages at least the environment information and the sensor data to generate forecast data using one or more machine-trained models. The forecast data describes predicted future states of one or more aspects of the physical environment. The technique then leverages at least the environment information, sensor data, and forecast data to generate a control plan. The control plan provides a strategy for controlling the devices in the physical environment within a specified span of time. More specifically, the strategy is selected such that it satisfies a specified optimization objective, subject to a set of specified constraints associated with the physical environment. Finally, the technique provides instructions to control the devices in the physical environment based on the control plan, e.g., by managing their use of the resource.

In one non-limiting use case, the physical environment includes one or more local energy devices which generate energy (such as photovoltaic panels, wind turbines, etc.) and/or which store previously-supplied energy (such as batteries, water coolers, etc.) and/or which consume energy. The optimization objective involves generating a control plan which leverages the local energy devices to reduce consumption of externally-supplied resource at selected times. For example, the technique can reduce consumption of power generated by a distribution substation during those times when a distribution substation is predicted to experience high loads.

In other implementations, the optimization objective involves minimizing an environmental impact associated with the consumption of the resource (such as by reducing carbon emissions), maximizing the efficiency at which the resource is consumed in the physical environment, minimizing failure conditions in the devices, maximizing user satisfaction, and so on.

According to another illustrative aspect, the optimization objective includes at least a first and second sub-objectives. Here, the technique generates the control plan by: generating two or more initial control plans which satisfy the first sub-objective; and choosing a control plan from the initial control plan(s) which most readily satisfies the second sub-objective.

According to another illustrative aspect, the technique involves: sending proposal information to a resource-providing system that describes the control plan; and receiving reply information from the resource-providing system in response to the proposal information. The technique sends the instructions to the physical environment when the reply information indicates that the resource-providing system has approved the proposal information.

According to another illustrative aspect, the technique uses a declarative-based solver component to generate the control plan, such as a mixed integer linear programming (MILP) solver component. Such a solver component attempts to satisfy a specified objective function subject to the set of constraints pertaining to the physical environment. For example, a constraint associated with an energy device describes the maximum amount of energy it can store. Another constraint describes a maximum rate of charging the energy device. Another constraint describes the preference of one or more users, and so on.

The technique offers various technical advantages. For instance, the technique can generate a precise and nuanced control plan by virtue of its reliance on rich contextual information provided by its digital representation of the physical environment. Such insight is not captured by narrowly modeling an individual machine or process; this is because such a tactic ignores the context in which the machine or process is used in the physical environment. For example, such a tactic ignores how users who have individual preferences interact with the machine or process, and/or the way in which the machine or process operatively fits into a larger framework of equipment within the physical environment.

According to another technical feature, the technique can quickly be applied to new physical environments without requiring labor-intensive customization effort. The technique achieves this flexibility by providing a uniform framework for describing different types of environments, together with the use of a declarative-based solver component. The declarative-based solver component is scalable because it automatically finds a solution which conforms to specified low-level constraints, without requiring a human analyst to manually develop a discrete set of rules or equations.

Specific use cases offer additional technical benefits. For example, the technique can generate a control plan which avoids (or reduces) the consumption of power at times in which a distribution substation is expected to be handling high loads. This benefits both the consumer and provider of power, e.g., by reducing the risk of a power outage. The technique can further lower the cost of power delivered to any building which consumes power at non-peak times. In addition, or alternatively, the technique can achieve other desirable goals, such as the reduction of carbon emissions, etc.

More specifically, in one implementation, customers of a power distribution system can leverage the above-described technique to facilitate their participation in a flexibility market hosted by a distribution system operator (DSO). The technique incentivizes each of the customers to strategically manage its consumption of power to reduce the cost of power that it consumes (and/or achieve other objective(s)). This also achieves the net result of more evenly distributing load placed on the distribution system. In one example, the individual customers are associated with buildings of any kind(s), although the technique can be applied with respect to any kind(s) of physical environment(s). By operating in the above-described manner, each customer's physical environment constitutes a flexible energy resource that can be strategically controlled to consume and/or generate power at selected times.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 8 and 9 collectively provide an overview of one manner of operation of the control system of FIG. 6.

FIG. 10 shows a tiered control strategy that can be employed by the control system of FIG. 6.

Figure 1:
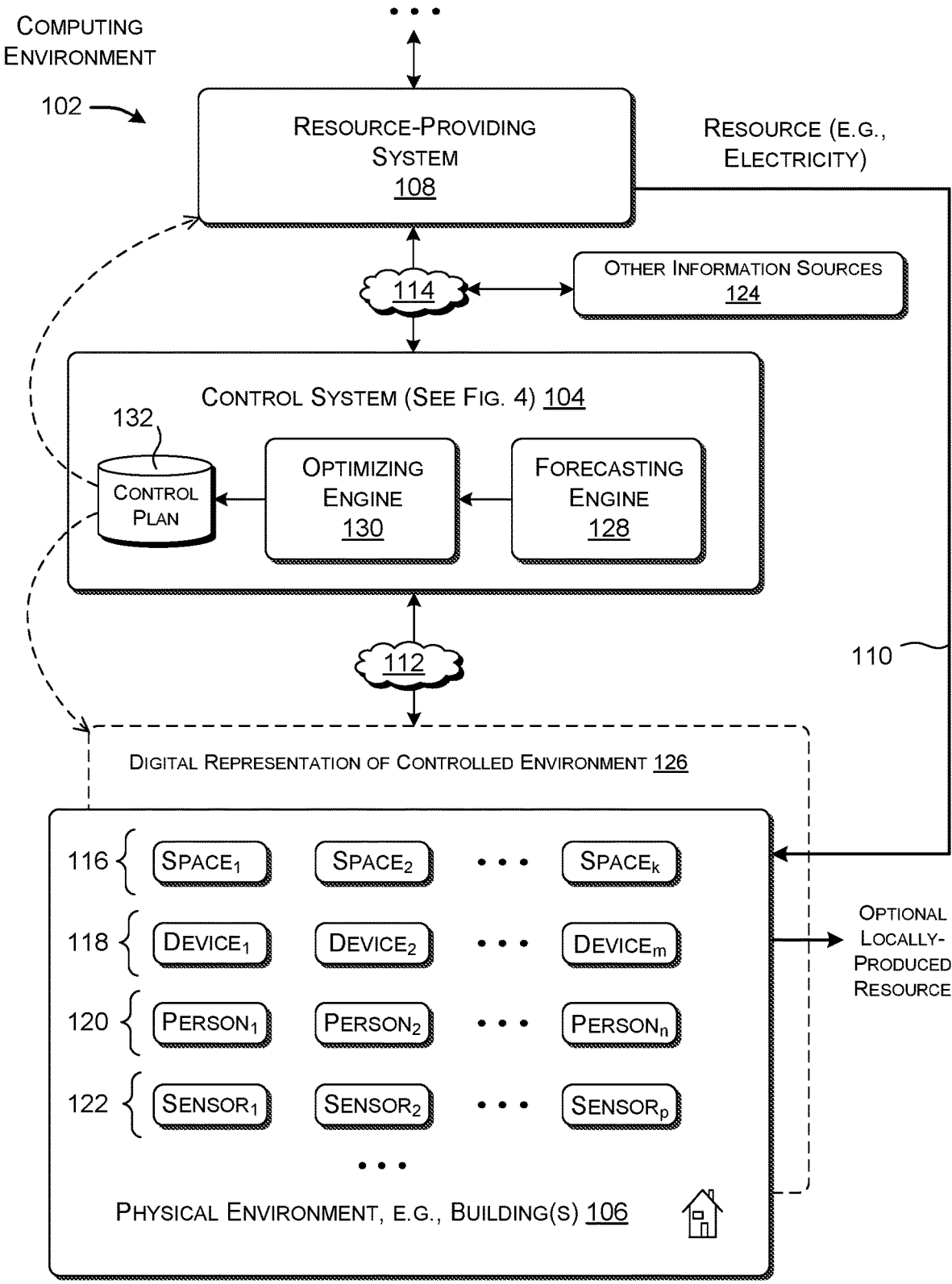
FIG. 1 shows an illustrative computing environment in which a control system governs the consumption of a resource (such as electric power) in a physical environment (such as a building), or which controls devices (and/or other entities) in other ways.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for controlling devices and/or other entities in a physical environment (such as a building). Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component" or "engine" refers to a part of the hardware logic circuitry that performs a particular function. In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 in which a control system 104 controls devices and/or other entities in a physical environment 106. To facilitate explanation, this Detailed Description will most prominently feature the example in which the control system 104 manages the consumption of a resource in the physical environment 106. The resource corresponds to electric power ("power") in these examples, but the principles described herein are applicable to the distribution of other resources, such as water, natural gas, etc. More generally, the control system 104 can control entities in other ways that do not necessarily involve consideration of the manner in which the entities in the physical environment consume power.

In the non-limiting example of FIG. 1, a resource-providing system 108 corresponds to the immediate source of the resource that is delivered to the physical environment 106 via local transmission infrastructure 110. For example, the resource-providing system 108 may include one or more distribution substations managed by a distribution system operator (DSO). The resource-providing system 108 may receive the resource, in turn, from one or more higher-level resource-providing systems, not shown, such as one or more power generation utilities. The control system 104 communicates with the physical environment 106 and the resource-providing system 108 via digital networks 112 and 114, respectively. Each digital network can correspond to a local area network, a wide area network, one or more point-to-point communication links, etc., or any combination thereof.

As will be clarified with respect to FIG. 2 below, the physical environment 106 may correspond to a physical setting of any kind and scope. In the example most prominently featured herein, the physical environment 106 corresponds to a building of any kind and size, such as, without limitation, a single-family household, an apartment building, a commercial building, an educational building, a governmental building, and so on. In other cases, the physical environment 106 corresponds to part of a single building. In other cases, the physical environment 106 corresponds to a campus setting which includes two or more buildings. In other cases, the physical environment 106 corresponds to an outdoor setting (such as a playing field, a park, etc.) or a mixed indoor/outdoor setting.

The physical environment 106 includes or is otherwise associated with at least: a set of spaces 116; a set of devices 118; a set of people 120; and a set of sensors 122. The spaces 116 correspond to regions within the physical environment 106, such as rooms, work zones, etc. The people 120 correspond to individuals who utilize the physical environment 106, such as the members of a household, the employees of a company, the students of a school, etc.

The set of devices 118 can correspond to any mechanisms that perform any respective functions. A subset of the devices 118 correspond to local energy devices. A local energy device corresponds to any device that is capable of producing energy, such as a wind turbine, a photovoltaic panel, a hydroelectric generator, a geothermal heat pump, etc. Alternatively, or in addition, a local energy device corresponds to any device for storing previously-supplied energy, such as a battery, a tank for storing cooled or heated water, etc. For instance, a commercial building may use externally-supplied power to cool a tank of water in advance of a day in which particularly high temperatures are expected; an air conditioning system may leverage the cool water on that day to cool the building, thereby reducing reliance on external-supplied power (which is likely to be costly). Other energy devices primarily consume energy in the physical environment 106. Without limitation, these kinds of devices include computing devices, audiovisual equipment, lighting devices, heating devices, cooling devices, elevators, electronic locks, chargers, kitchen appliances, laundry room equipment, electronic toys, etc.

The sensors 122 measure various conditions in the physical environment using any data capture mechanisms. For example, an optical sensor provided near the doorway of a conference room can detect the number of people in a room, e.g., by generating a signal when anyone passes through the door. A temperature sensor can measure the temperature in the conference room. A battery sensor can measure the remaining charge of a battery located within the conference room. A utility sensor can measure the amount of power or other resource consumed by a device, and so on. In general, a first subset of sensors are integrated with respective devices, or are otherwise associated with these devices. A second set of sensors are not directly coupled with any particular devices.

FIG. 1 also indicates that the control system 104 can receive information from one or more other information sources 124. For example, the control system 104 can receive weather data from an external computing system devoted to reporting the weather. The control system 104 can receive calendar data pertaining to the people 120 from an external computing system that maintains calendar information, and so on.

The control system 104 maintains a digital representation 126 that describes the physical environment 106. By way of overview, the digital representation 126 stores environment information and state information. The environment information describes the various entities in the physical environment 106 and the relationships among those entities. The state information describes the current states of the entities, and, in some cases, the previous and future states of those entities. The entities include at least the spaces 116, devices 118, people 120, and sensors 122 associated with the physical environment 106. Overall, the digital representation 126 can be considered as a virtual counterpart or digital twin of the physical environment 106. The control system 104 can interact with the physical environment 106 through the intermediary provided by the digital representation 126.

Finally, FIG. 1 shows a simplified version of the control system 104 itself. The control system 104 includes a forecasting engine 128 for forecasting the future states of one or more aspects of the physical environment 106 with respect to a specified span of future time (such as the next seven days). This yields forecast data. The forecasting engine 128 performs this task based on: the environment information that describes the makeup of the physical environment 106; sensor data received from the sensors 122 provided by the physical environment 106 (including both current sensor readings and prior sensor readings); and (optionally) external information provided by one or more other information sources 124. In one implementation, the forecasting engine 128 can generate the forecast data using one or more machine-trained models.

An optimizing engine 130 generates a control plan that provides a strategy for controlling consumption of the resource in the physical environment 106 over a specified span of time (such as the next seven days), or performing some other control function. The optimizing engine 130 generates the control plan such that it satisfies a specified optimization objective, subject to a specified set of constraints. The optimizing engine 130 performs its operation using a declarative-based solver component, e.g., using a mixed integer linear programming (MILP) solver component. The optimizing engine 130 more generally performs its task based on: the environment information that describes the makeup of the physical environment 106; sensor data received from the sensors 122 provided by the physical environment 106 (including both current readings and prior readings); forecast data generated by the forecasting engine 128; and (optionally) other information provided by one or more external information sources 124. A data store 132 stores the control plan.

In one implementation, the control system 104 generates instructions based on the control plan and sends those instructions to the devices 118 of the physical environment 104. The devices 118 govern their operation based on the instructions, e.g., by turning heating and cooling equipment on and off at instructed times, etc. In another implementation, the control system 104 generates proposal information based on the control plan, and then sends that proposal information to a bid-processing engine (not shown) provided by the resource-providing system 108. The bid-processing engine processes the proposal information in a manner described below, upon which it generates reply information that either accepts or rejects the control plan in whole or part. Upon acceptance of the control plan, the control system 104 then forwards instructions to the physical environment 106 to control its operation.

Figure 2:
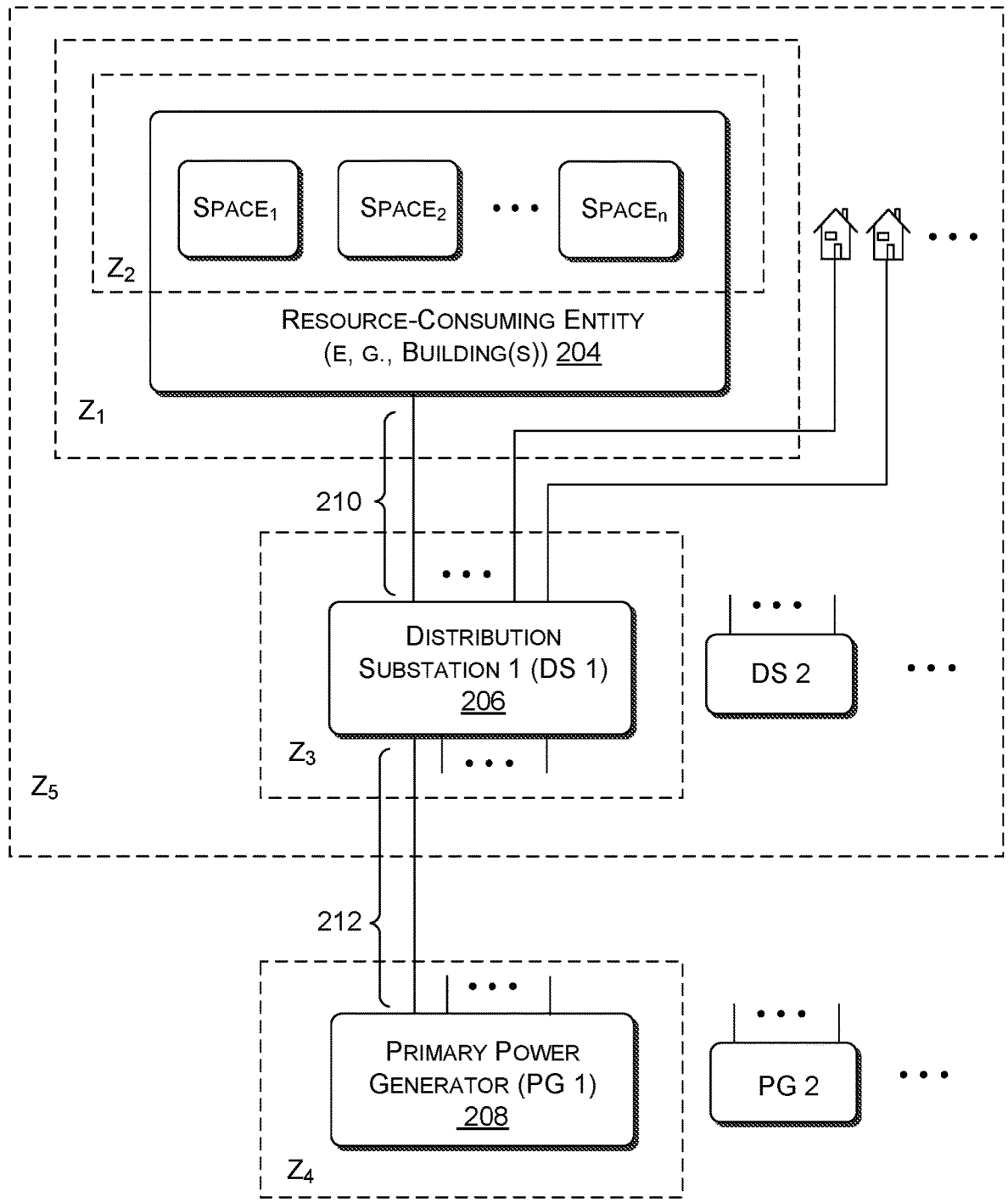
FIG. 2 shows a resource distribution framework. This figure makes the point that the control system of FIG. 1 can be applied with respect to different scopes of analyses.

FIG. 2 shows a resource distribution framework 202. The resource distribution framework 202 shows an illustrative resource-consuming entity 204 which consumes a resource (such as electric power), an illustrative distribution substation 206 which provides the resource to a community of resource-consuming entities (including the resource-consuming entity 204), and an illustrative primary power generator 208 which provides the resource to a plurality of distribution substations (including the distribution substation 206). A DSO manages a distribution system that includes one or more distribution substations, including the distribution substation 206. But to facilitate explanation, in the following examples, assume that the DSO manages just the distribution substation 206. Local (retail) transmission infrastructure 210 delivers the resource from the distribution substation 206 to the resource-consuming entity 204. Wholesale transmission infrastructure 212 delivers power from the primary power generator 208 to the distribution substation 206. The transmission infrastructures (210, 212) include various transmission lines, transformers, etc., each of which has various characteristics (including constraints) associated therewith. For example, a transmission line has an upper limit which defines the maximum power it can deliver. Assume that the resource-consuming entity 204 corresponds to a building of any size and complexity, although the resource-consuming entity 204 can more generally correspond to any physical setting.

The dashed-line boxes shown in FIG. 2 illustrate different scopes of analyses and control to which the control system 104 may be applied. The different scopes also identify the target beneficiaries of the analysis performed by the control system 104, corresponding to the entity which benefits from the optimization performed by the control system 104. Each scope of analysis also defines the scope of the "physical environment" to which optimization is directed.

In the scope labeled $Z_1$, the control system 104 generates a control plan which optimizes the consumption of the resource by the resource-consuming entity 204 so as to maximize one or more objectives, such as the reduction of cost, the reduction of carbon emissions, etc. Here, the resource-consuming entity 204 is the target beneficiary of the control plan. For example, a control plan may direct the resource-consuming entity 204 to consume power at times at which the distribution substation 206 is not facing high loads. This plan reduces the cost of the power delivered to the resource-consuming entity 204, presuming that power costs less at non-peak times compared to peak-load times. Other entities in the framework 202 may also benefit from this control plan, although not the principal beneficiaries. For instance, the control plan may benefit the distribution substation 206 by spreading its load over time, reducing the risk of power outage. It also benefits the general public to the extent that it reduces the release of carbon emissions; this is true if the minimization of carbon emissions is part of the optimization performed by the control system 104.

In a second scope ($Z_2$) of analysis, the control system 104 performs its analysis with respect to one or more spaces within the resource-consuming entity 204, such as one or more floors of a building, or one or more rooms in a building, etc. In one implementation, the control system 104 can first perform optimization with respect to the first scope ($Z_1$), associated with the resource-consuming entity 204 as a whole. The control system 104 then performs optimization with respect to the second scope ($Z_2$). In performing this second optimization, the control plan established by the first optimization constitutes a fixed constraint; it defines the total amount of resource that is available to the resource-consuming entity 204 at any given time within a prescribed span of time (e.g., seven days). The second optimization determines how that total amount of resource should be optimally distributed among the spaces of the resource-consuming entity 204. The second optimization can rely on the same optimization objective(s) as the first optimization, or it can introduce one or more new optimization objectives. More generally, the control system 204 can apply a top-down optimization strategy with respect to any number g of levels of analysis within the framework 202.

In a third scope ($Z_3$) of analysis, the control system 104 can generate a control plan that governs how the distribution substation 206 distributes the resource to all of its customers, including the resource-consuming entity 204. Here, the control system 104 applies an optimization objective to maximize a benefit to the distribution substation 206 (and the DSO associated therewith), such as by spreading its load over time to the greatest extent possible. Or the control system 104 can apply an optimization objective to perform the more limited goal of preventing a load over a specified threshold value. In another scope of analysis (not shown), the DSO can perform this optimization for its entire distribution system, e.g., by performing optimization for each distribution substation individually, and/or by performing optimization for all of its distribution substations in aggregate. In a fourth scope ($Z_4$), the control system 104 performs the same task described above, but from the vantage point of the primary power generator 208. In a fifth scope ($Z_5$), the control system 104 applies an optimization objective that explicitly attempts to mutually benefit the distribution substation 206 and its customers. For example, the control system 104 may attempt to develop a control plan that both: (1) spreads the load at the distribution substation 206 over time for the benefit of the distribution substation 206; and (2) attempts to the lower the cost of power to its customers for the benefit of the customers.

The above scopes of analyses are set forth in the spirit of illustration, not limitation. Other implementations can apply the control system 104 to yet other scopes of analyses. To facilitate explanation, the remainder of the Detailed Description will emphasize the first-mentioned use case (corresponding to scope $Z_1$); to repeat, in this case, the control system 104 optimizes the consumption of resource by the single resource-consuming entity 204, which may correspond to a single building.

Figure 3:
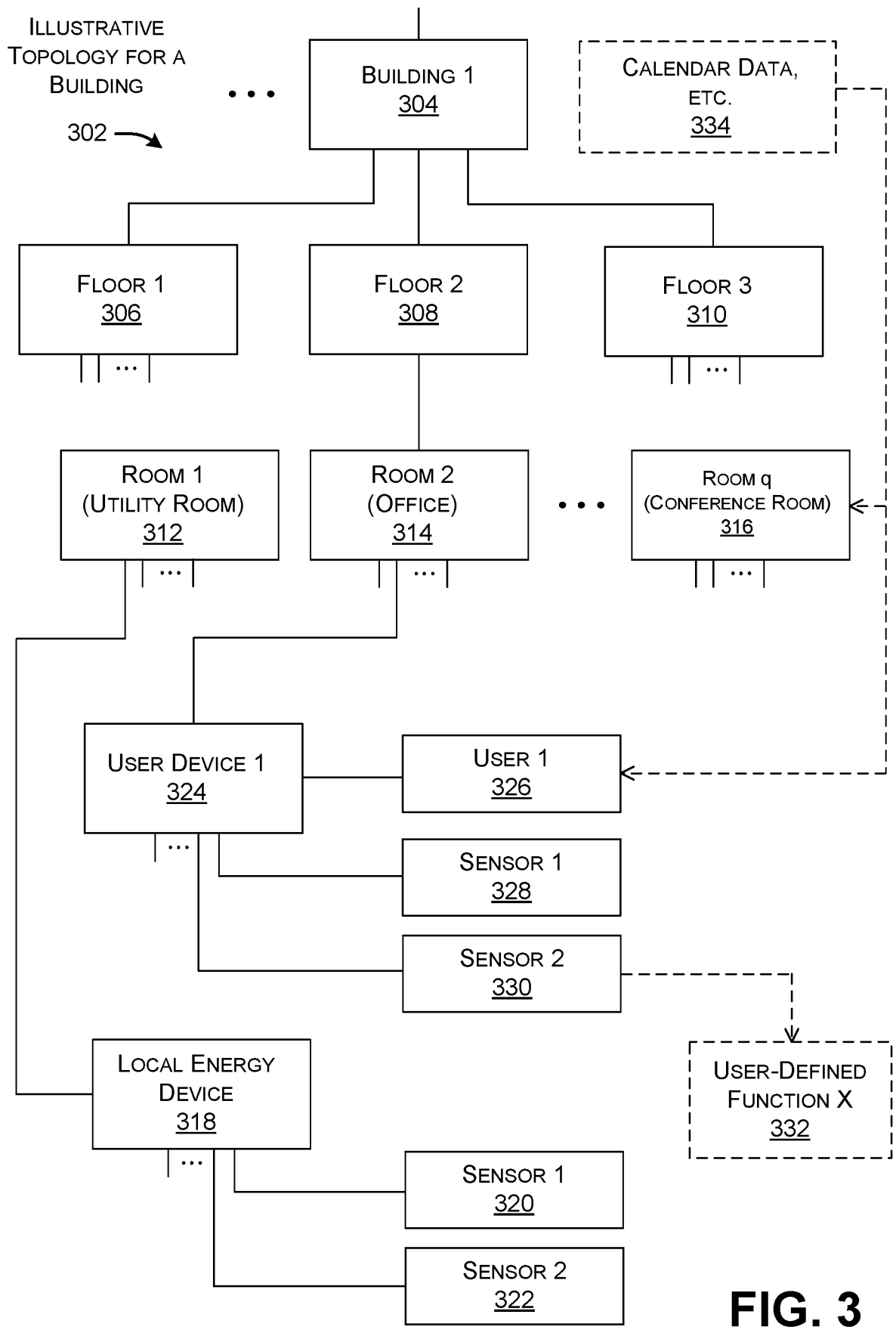
FIG. 3 shows a topology that represents one physical environment to be controlled.

FIG. 3 shows a topology 302 that represents one physical environment to be controlled. Here, the physical environment 106 corresponds to a building that includes a plurality of floors, each of which includes a plurality of rooms. The topology 302 corresponds to a data structure which assigns a node to each of the entities associated with the physical environment 106, including at least its floors, rooms, user devices, users, and sensors. Each node corresponds to an object in object-oriented programming paradigm. The topology 302 also connects the entities with links to form a graph. Here, the graph has a hierarchical structure which generally duplicates the top-down organization of entities in the physical environment. FIG. 3 shows a subset of the nodes and links which make up the topology 302.

More specifically, the topology 302 includes a building node 304 which represents the physical environment as a whole. Although not shown, the building node 304 may, in turn, represent a child node with respect one or more "higher" levels in the hierarchy. For example, another node (not shown) can represent a campus environment of which the building is a part. A yet higher node may represent a region of the country in which the campus is located, etc.

The building has three floors represented by three respective floor nodes (306, 308, 310). The second floor includes a set of rooms, including at least a utility room 1 (represented by room node 312), an office room 2 (represented by room node 314), and a conference room q (represented by room node 316). Room 1 includes at least a local energy device (represented by device node 318), such as a battery. The local energy device includes two sensors which measure its performance (represented by sensor nodes 320 and 322), such as its remaining charge and its current temperature. Room 2 includes at least a user device (represented by device node 324), such as a computer workstation. The user device is associated with a user (represented by a user node 326) and two sensors (represented by sensor nodes 328 and 330). The user has previously created a user-defined function 332 and paired it to the sensor node 330. As a result, the user-defined function 332 will perform an operation on an output data stream produced by the sensor associated with the sensor node 330. For example, the user-defined function may compute an average of the sensor data, or compare the sensor data to a predicted threshold, or normalize the sensor data, and so on.

As previously noted, one or more external information sources 124 may contribute data to the control system 104. This data can be linked to the nodes in the topology 302. For example, the control system 316 can consult calendar data 334 to determine the likely occupants of the conference room q at a particular time. Further, the control system 104 can consult human resource (HR) data to identify contact information or demographic information pertaining to the user associated with the user node 326 (presuming that the user has authorized this access).

Although not shown in FIG. 3, the control system 104 can provide permission information which identifies the users who are authorized to interact with the different parts of the topology 302 (and the entities and functions associated therewith). For example, the control system 104 may store permission information which identifies a set of users who are permitted to access the output of a particular sensor, or a particular user-defined function, etc. Other permission information may identify a set of users who are permitted to modify certain parts of the topology 302, and so on.

Figure 4:
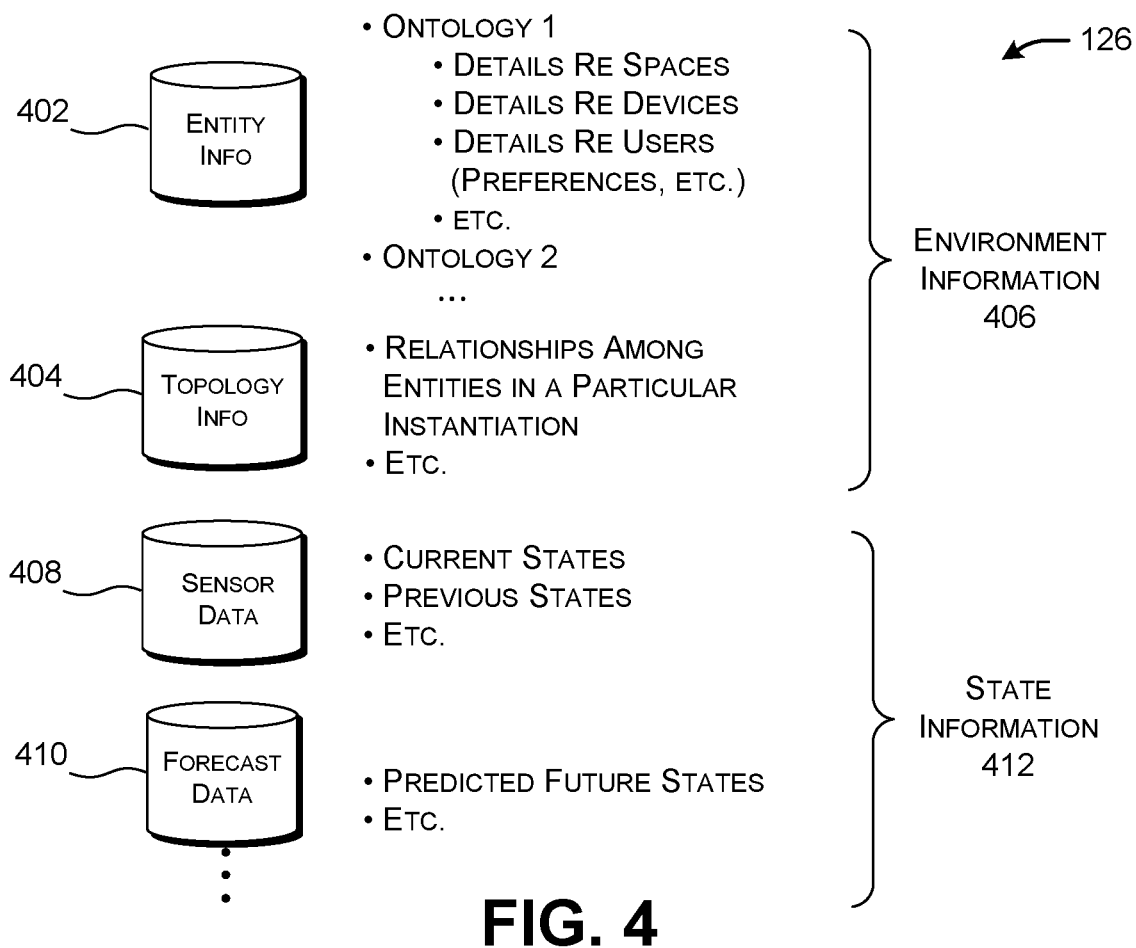
FIG. 4 shows various fields of information that the control system can store, which collectively provide a digital representation of a physical environment to be controlled.

FIG. 4 shows various fields of information associated with the digital representation 126 of the physical environment 106. Overall, as described above, the digital representation 126 provides a virtual counterpart to the physical environment 106. First, the digital representation 126 includes entity information in a data store 402 which describes the various kinds of entities that may be found in one or more ontologies. Each ontology is associated with a class of physical environments. For example, a first ontology may describe things commonly found in ordinary households. A second ontology may describe things found in office buildings. A third ontology may describe things commonly found in hospitals, and so on. For example, consider an ontology associated with a building that serves as a hospital. The entries of this ontology describe different kinds of spaces, devices, and people commonly found in hospitals.

The digital representation 126 also includes topology information in a data store 404 which describes how a specific set of entities, associated with a particular ontology, are connected together to form a graph (such as the graph shown in FIG. 3). Each node in a specific topology refers to a specific instantiation of an object type defined in a particular ontology. For example, consider the case of the conference room q, associated with the node 316 of FIG. 3. That node 316 constitutes an object having a set of properties defined by the entity information in the data store 402, associated with a particular ontology. Those properties have values which describe the specific conference room q under consideration, e.g., by specifying the size of the room, the orientation of the room, the maximum capacity of the room, and so on.

When combined together to describe a particular physical environment 106, selected entity information in the data store 402 and the topology information in the data store 404 correspond to environment information 406. The environment information 406 captures the structure and makeup of the physical environment 106. That is, the environment information 406 includes: first information which describes the specific entities associated with the physical environment 106; and second information which describes relations among the entities in the physical environment 106.

The digital representation 126 also includes sensor data in a data store 408. The sensor data includes sensor readings collected from the sensors 122 dispersed throughout the physical environment 106. The sensor data expresses the states of various entities in the physical environment 106. More specifically, the sensor data includes current sensor data that describes the current states of entities being monitored. The sensor data also encompasses previously-collected (historical) sensor data that describes the prior states of the entities being monitored.

The digital representation 126 also includes forecast data in a data store 410, supplied by the forecasting engine 128. The forecast data describes the anticipated future states of various entities in the physical environment. For example, the forecast data can describe the anticipated occupancy of a room in a building throughout the week, the expected overall consumption of power in the building, and so on. Together, the sensor data and the forecast data correspond to state information 412.

Figure 5:
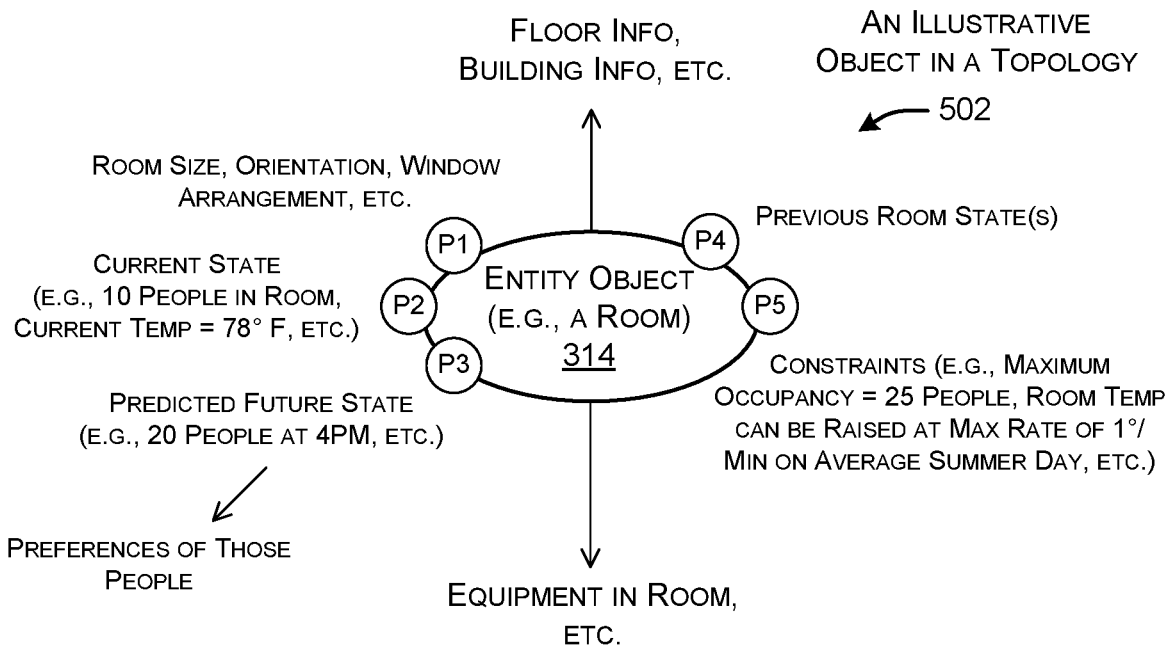
FIG. 5 shows an illustrative object in a topology, and the properties and relations associated therewith.

FIG. 5 shows an illustrative object 502 in a topology, and the illustrative properties and relations associated therewith. Again assume that the object 502 describes the conference room q in a particular office building, corresponding to the object node 316 of FIG. 3. As shown, the object 502 has a set of properties. The values assigned to these properties may originate from various sources, such as: the sensor data, the forecast data, external information, and/or the environment information 406, etc.

For example, the object 502 includes a first set of properties which describe the physical characteristics of the room, such as its size, it orientation, its arrangement of windows, etc. The object 502 includes a second set of properties that describe its present state, as gleaned from the sensors associated with the room. For example, the sensor data may reveal that there are currently ten people in the room, and the room temperature is currently 78° F., etc. The object 502 includes a third set of properties which describe its anticipated future state, such as the prediction that it will host twenty people at 4:00 PM. FIG. 5 also indicates that the object 502 is linked to user information that describes heating and cooling preferences of the people who are expected to occupy the room at 4:00 PM. The object 502 includes a fourth set of properties which describe the previous states of the conference room, such as the average daily consumption of energy in the conference room over the last 30 days.

The object 502 also includes a fifth set of properties which describe constraints associated with the conference room. The optimizing engine 130 leverages these constraints in generating its optimal solution. For example, one constraint can indicate that the conference room has a maximum capacity of 25 people. Another constraint can indicate that the temperature of the conference room can be raised at a maximum rate of 1° F. per minute on an average summer day. Still other constraints of a context-specific nature may derive from the stated cooling and heating preferences of users who will occupy the conference room at 4:00 PM, and so on.

The above set of properties is set forth by way of illustration, not limitation. Other implementations can store a wealth of additional information regarding any entity in a physical environment 106, depending on the role served by that entity within that setting, the type of sensors associated with the entity, and so on.

Figure 6:
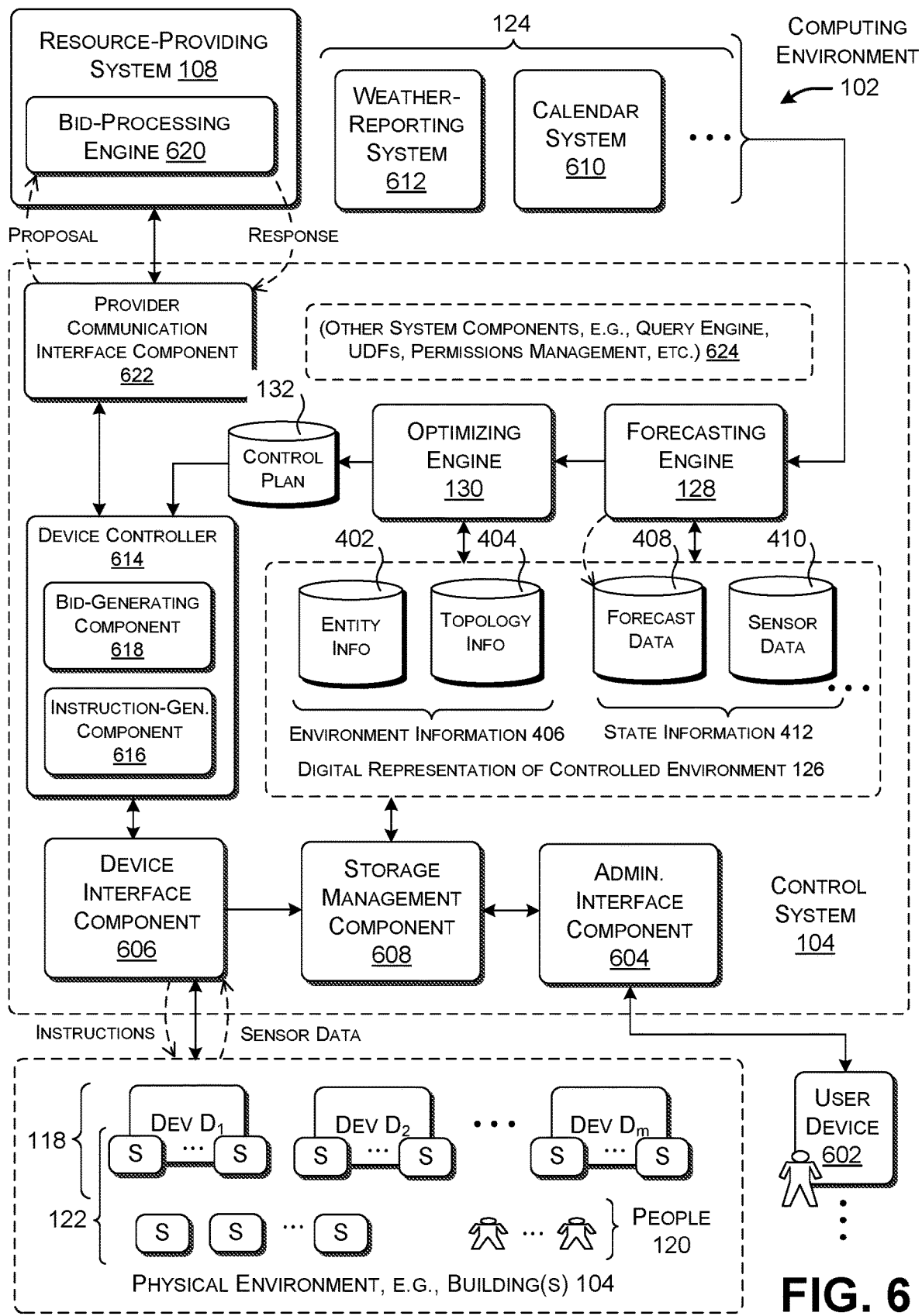
FIG. 6 shows a more detailed representation of the control system of FIG. 1.

FIG. 6 shows a more detailed representation of the control system 104 of FIG. 1. To repeat, the control system 104 manages the consumption of a resource (such as power) by a physical environment 106, and/or manages entities in the physical environment 106 in some other way. The physical environment 106, includes a plurality of spaces 116 (not shown in FIG. 6), a plurality of devices 118, a plurality of people 120, and a plurality of sensors 122. The devices 118 include a subset of local energy devices, such as batteries, water tanks, etc. Some sensors are associated with respective devices 118, while other sensors are not.

In one implementation, one or more computing devices of any kind(s) implement the control system 104, such as one or more servers. FIG. 6 depicts the control system 104 apart from the physical environment 106 which it controls. But in some implementations, the control system 104 may form a part of the physical environment 106 itself, e.g., corresponding to one or more computing devices located in a control room of the physical environment 106.

One or more user computing devices (such as the representative user device 602) may allow an administrative user to interact with the control system 104 via an administrative interface component 604. For instance, the administrative user can use this mode of interaction to load new environment information 406 into the digital representation 126 (e.g., corresponding to a new ontology), to change existing environment information 406, to modify permission information, and so on. Each user computing device can correspond to any kind of computing equipment, such as a workstation personal computing device, a smartphone or other type of handheld computing device, a mixed reality device of any type, a game console, and so on. The administrative interface component 604 can provide a set of application programming interfaces (APIs) which implement the above-described interaction.

The control system 104 includes a device interface component 606 for receiving sensor data from the sensors 122 in the physical environment 106, e.g., in the form of a plurality of data streams. The device interface component 606 can also perform various processing tasks, such as appending or otherwise associating metadata to each instance of sensor data. The metadata may identify the sensor from which a particular instance of sensor data originates. Alternatively, or in addition, the metadata may describe the space, device, and/or user that is associated with the sensor (if any). A storage management component 608 stores the sensor data in the data store 410, which forms part of the digital representation 126.

As previously described, the forecasting engine 128 generates forecast data, which it stores in the data store 408. The forecasting engine 128 performs its predictions based on the sensor data, the environment information 406, and (optionally) other information obtained from one or more external information sources 124. For example, a calendar system 610 provides calendar data to the forecasting engine 128, a weather-reporting system 612 provides weather data to the forecasting engine 128, and so on. Each external system may correspond to one or more computer servers which provide data to the control system 104 via any type of computer network (e.g., the Internet).

The optimizing engine 130 generates a control plan and stores that plan in the data store 132. The optimizing engine 130 performs its optimizations based on the sensor data in the data store 410, the forecast data in the data store 408, the environment information 406, and (optionally) other information obtained from one or more external information sources 124.

In one implementation, a device controller 614 includes an instruction-generating component 616 that generates instructions based on the control plan and sends those instructions to the devices 118, via the device interface component 606. Alternatively, or in addition, the instruction-generating component 616 can send instructions to users or other target entities. The instructions sent to the devices 118 govern the manner in which the devices 118 operate, such as the manner in which the devices 118 consume the resource within the physical environment 106. The instructions sent to users instruct the users to perform specified actions.

The instruction-generating component 616 can generate instructions in any environment-specific manner. For example, assume that a control plan includes an entry that indicates that a battery should begin charging at a particular time. To carry out this entry, the instruction-generating component 616 generates an instruction that directs the battery to begin charging at the particular time. In another case, the control plan may indicate that a meeting on a first floor should be moved to a second floor, and heating delivered to the entire first floor should be shut off or otherwise reduced. In response, the instruction-generating component 616 can enlist the calendar system 610 to notify the meeting participants of the new meeting location (and, optionally, a new time). The instruction-generating component 616 can also send an instruction to one or more thermostats which direct them to lower the temperature at a specified time. In yet another case, assume that the optimization objective seeks to reduce failures in the physical environment 106. Here, the instruction-generating component 616 can send instructions to devices which modify their operating conditions and/or failure-detecting thresholds, with the goal of reducing occurrence of future failures. The instruction-generating component 616 can also provide instructions to maintenance personnel which instruct them to perform maintenance on specified devices.

In another implementation, a bid-generating component 618 formulates proposal information based on the control plan, and submits the proposal information to a bid-processing engine 620 provided by (or otherwise associated with) the resource-providing system 108, via a provider communication interface component 622. The bid-processing engine 620 uses any internal logic to determine whether the control plan is acceptable or not, upon which it sends back reply information to the device controller 614 via the provider communication interface component 622. The reply information accepts the control plan in whole or part. The resource-providing system 108 can implement the bid-processing engine 620 using one or more servers. The provider communication interface component 622 can implement the above-described interaction using one or more APIs.

If the control plan is accepted in whole, the instruction-generating component 616 sends control instructions to the physical environment 106 in the same manner specified above. If the control plan is rejected in whole or in part, the bid-generating component 618 can reformulate it, e.g., by asking the optimizing engine 130 to modify the control plan itself and/or by increasing the monetary bid(s) (described below) associated with the existing control plan. The bid-generating component 618 then submits reformulated proposal information to the bid-processing engine 620. This process continues until the bid-processing engine 620 accepts the control plan in whole, or until some other termination condition is reached (such as the submission of a prescribed number of instances of proposal information without success).

The following example will clarify the above-described bidding process. Assume that the resource-providing system 108 corresponds to a distribution substation which delivers electric power to a set of customers, including the physical environment 106. Assume that a DSO manages this single distribution substation. The bid-generating component 618 generates the proposal information by associating a monetary bid with the control plan as a whole, or to individual consumption entries within the control plan. For example, assume that the control plan directs the physical environment 106 to consume no (or reduced) externally-supplied power between 4:00-7:00 PM each workday of the week, which corresponds to a period in which the distribution substation is expected to experience peak loads. Instead of externally-supplied power, the control plan instructs the physical environment 106 to consume power provided by a bank of batteries located in the physical environment 106. Furthermore, the control plan instructs the physical environment 106 to charge these batteries between 1:00-3:00 AM on each workday of the week. Assume that the load placed on the distribution substation is relatively low between 1:00-3:00 AM (compared to its peak load hours), and is relatively cheap (again compared to the pricing of energy at its peak load hours). In one implementation, the bid-generating component 618 generates its proposal information by appending a single monetary bid to its overall control plan. In another implementation, the bid-generating component 618 can append a monetary bid to each of its individual proposals, e.g., by appending a bid to the proposed energy shift on each workday, etc. In any case, the bid-generating component 618 can set each initial bid to an initial default value, and thereafter incrementally raise it upon each rejection by the bid-processing engine 620. Or the optimizing engine 130 can itself determine the price associated with each bid as part of its optimization process. Or the optimizing engine 130 can determine at least the price associated with the initial bid. In one implementation, each bid constitutes an amount of money or other benefit that the customer asks the utility company to award it upon consuming power in a proposed manner. These monetary awards operate as incentives for the customers to shift their energy usage away from peak load hours.

The bid-processing engine 620 can use any strategy to process bids. Without limitation, in one implementation, the bid-processing engine 620 can execute its own optimization algorithm, the dual objective of which is to spread out its load to the greatest extent possible at the lowest cost to itself. For example, the bid-processing engine 620 can execute the following decision logic. Assume that historical trends reveal that many people attempt to recharge their electric vehicles between 4:00-7:00 PM on the weekdays. If the aggregate load associated with this activity is not rebalanced, it runs the risk of exceeding the maximum capacity of the distribution substation. This event may damage the distribution substation. To address this problem, the bid-processing engine 620 may attempt to shift its anticipated load at this peak period to other times during the day. To accomplish this task, it will identify the subset of control plans (if any) which promise to shift consumption away from the identified peak period of consumption. It will then accept that control plan (or part thereof) associated with the lowest bid. Or the bid-processing engine 620 will accept two or more of the lowest-cost bids. This strategy is one of many tactics that the distribution substation can adopt. In one implementation, the bid-processing engine 620 uses the same type of processing performed by the forecasting engine 128 and the optimizing engine 130 of the control system 104, but with a different objective function and set of constraints compared to those used by the control system 104.

More specifically, in one implementation, customers of a power distribution system can leverage the above-described technique to facilitate their participation in a flexibility market hosted by a DSO. The customers implement the technique through respective local instantiations of the control system 104. The technique incentivizes each of the customers to strategically manage its consumption of power to reduce the cost of power that it consumes (and/or achieve other objective(s)). This also achieves the net result of more evenly distributing load placed on the distribution system. In one example, the individual customers are associated with buildings of any kind(s), although the technique can be applied with respect to any kind(s) of physical environment(s).

By operating in the above-described manner, each customer's physical environment constitutes a flexible energy resource that can be strategically controlled to consume and/or generate power at selected times. That flexible energy resource represents, in aggregate, all of the individual local energy devices that can be strategically controlled to achieve the above objective(s). For example, assume that a building relies on a bank of batteries to lower the consumption of externally-supplied power at those times at which the distribution system is facing peak loads. The building can be treated as a single aggregate battery that can be strategically controlled to achieve the above objective(s).

To reiterate, the control system 104 can entirely omit the above-described bidding process. In that case, the instruction-generating component 616 immediately sends the control instructions to the physical environment 106 without seeking approval from the distribution substation.

Finally, the control system 104 can include other components 624, such as a query engine, user-defined functions (UDFs), a permission-management system, etc. The query engine allows an authorized user to retrieve any information maintained by the digital representation 126 or other information maintained by the control system 104. The permission management system manages the permissions associated with different parts of a topology. Each user-defined function corresponds to a program defined by a user for performing some operation on a stream (or plural streams) of sensor data.

Figure 7:
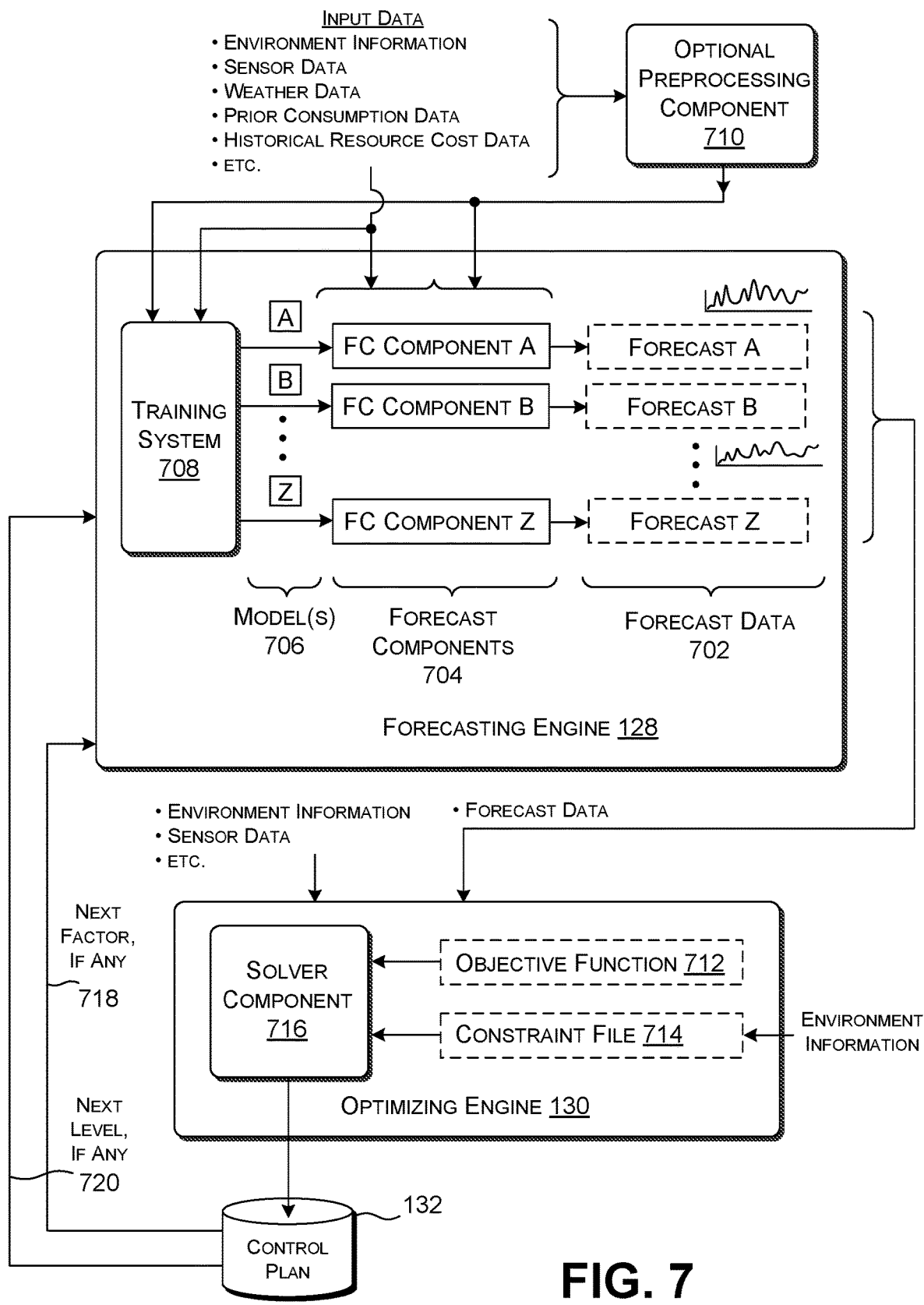
FIG. 7 shows one implementation of a forecasting engine and an optimizing engine for use in the control system of FIG. 6.

FIG. 7 shows one implementation of the forecasting engine 128 and the optimizing engine 130. Starting with the forecasting engine 128, the forecasting engine 128 transforms plural instances of input data into forecast data 702 using a set of forecasting (FC) components 704. The forecasting components 704, in turn, rely on a set of machine-trained model(s) 706 produced by a training system 708. The training system 708 generates the model(s) 706 based on the input data.

The input data can include various information extracted from the digital representation 126, such as the environment information 406, current sensor data (reflecting current states of entities in the physical environment 106), prior sensor data (reflecting previous states of entities in the physical environment 106), etc. The input data can also include weather data received from the weather-reporting system 612, calendar data received from the calendar system 610, and historical resource cost data received from the resource-providing system 108 (or from some other reporting system). The historical resource cost data describes the actual cost of the resource provided by the resource-providing system 108 over a prescribed period of time, such as for every hour over the last six months. The input data can also include prior resource consumption data that describes an amount of resource that the physical environment 106 has actually consumed over an identified span of time, specified with respect to any temporal granularity (e.g., every hour). Further note that the forecast data generated by any forecasting component can serve as input data for another forecasting component.

An optional preprocessing component 710 may perform any preprocessing operations on the input data prior to processing by the forecasting engine 128. For example, the physical environment 106 can include a set of sensors in different rooms which measure occupancy in those rooms. The preprocessing component 710 can generate a single "virtual" sensor reading which provides a measure of the total number of occupants in the physical environment 106 at the present time.

Although not shown, a post-processing component can perform any post-processing operations on the forecast data. For example, one instance of forecast data may predict some future state of a room in a building. The post-processing component can extend this prediction to the entire building by multiplying the prediction by the number of rooms in the building, or by performing some other sensor-specific aggregation operation.

Each forecasting component maps one or more instances of input data into an instance of forecast data using a machine-trained model. For example, a first forecasting component can map time data, calendar data, prior occupancy data, etc. into expected future occupancy data. A second forecasting component can map time data, prior resource cost data, weather data, etc. into expected future resource cost data. The future resource cost data may reveal one or more spikes in which the cost of the resource is relatively high; these periods will typically correspond to periods in which there is a high demand for the resource, and which there exists a risk of the resource-providing system 108 becoming overloaded. A third forecasting component can map time data, expected occupancy data, and weather data into a measure of expected future resource consumption data, and so on. The future resource consumption data describes the amount of resource that the physical environment 106 is expected to use in the future. More generally, for each time instance, each forecasting component can provide a prediction coupled with confidence information which describes the level of confidence associated with the prediction. Further, each forecasting component can generate predictions at any temporal granularity (e.g., for every hour) for a specified span of future time, such as for the next seven days.

In one implementation, each forecasting component can employ a machine-trained model of any type. Without limitation, such a model can correspond to a Support Vector Machine (SVC) model, a decision tree model, a neural network of any type (such as a feed-forward deep neural network, a convolutional neural network, a recurrent neural network, etc.), a clustering-type model, a Bayesian network model, etc. The training system 708 can train each such model using any technique (such as the gradient descent technique) based on a set of training data. Each instance of training data corresponds to a pairing of an input condition X with an instance of forecast data Y. For example, an example may specify that, for a time of $X_1$, an occupancy level of $X_2$, and a weather condition of $X_3$, the resource consumption in the physical environment will be Y. This pairing is labeled as valid (true) when it has actually been observed in the past. The training system 708 can also artificially produce false pairings for training purposes, e.g., by arbitrarily pairing input conditions with forecast results. In one implementation, the training system 708 retrains each model at a prescribed frequency, such as every 10 minutes.

In another implementation, the training system 708 can choose a type of machine-trained model for each forecasting component that provides the most accurate forecast data. For instance, the training system 708 can: (1) generate a set of n different types of machine-trained models based on a training data set; (2) measure the effectiveness of each model using a verification data set; and then (3) choose the model that provides the best results. The performance of any model can be measured using known metric(s), such as using a Receiver Operating Characteristic (ROC) curve, etc.

In another implementation, the training system 708 can produce a multi-component machine-trained model which represents a combination of different types of constituent machine-trained models. For example, in use, the multi-component machine-trained model can use plural machine-trained models to map input data into a set of output results with associated confidence scores. The multi-component model then operates as a multiplexer which selects and outputs the output result having the highest level of confidence associated therewith. Based on this manner of operation the multi-component model can produce forecast data for a span of time (e.g., seven days) which includes output results generated by different constituent machine-trained models, e.g., by using model X for day 1, model Y for day 2, and model Z for day 3, etc. In another implementation, the multi-component model can output all of the output results provided by its constituent machine-trained models, with confidence scores describing the level of confidence associated with each output result. In another implementation, the multi-component model can use a final-stage machine-trained model that maps a set of output results (and their associated confidence scores) into a final output result. Still other implementations of a multi-component machine-trained model are possible.

Now advancing to the optimizing engine 130, this component can receive various instances of input data, such as the environment information 406, the sensor data, the forecast data generated by the forecasting engine 128, etc. It also receives an objective function 712 which defines an optimization objective, such as the minimization (or maximization) of some desired result. The optimizing engine 130 also receives a constraint file 714 which describes a set of constraints associated with the physical environment 106.

One optimization objective directs the optimizing engine 130 to minimize the cost incurred by the building for consuming the resource. More generally, this optimization objective entails optimizing at least one metric (e.g., cost) that measures an extent to which the physical environment consumes an externally-supplied resource during times designated as preferable. A time is assessed as preferable in relation to the anticipated load at the resource-providing system 108 at that time. For instance, a preferable time is a time at which the resource-providing system 108 experiences relatively low load, and at which the cost of power is commensurately low (compared to times of peak or near-peak capacity). In applying this optimization objective, the optimizing engine 130 will generally act to shift resource consumption away from those periods in which the forecasted resource cost is high.

Other illustrative optimization objectives can include any of: the minimization of the cost to the building for consuming the resource; the minimization of some negative environmental impact (such as carbon emissions); the maximization of user satisfaction (such as user comfort); the maximization of efficiency with which the resource is consumed; the minimization of the number of failures in the physical environment 106, and so on.

A solver component 716 generates a control plan that satisfies the objective function 712, subject to the constraints specified in the constraint file 714. The solver component 716 stores the control plan in the data store 132. In one implementation, the control plan specifies how the physical environment is to operate within a specified span of time, such as for every hour within the next seven days.

More specifically, in one implementation, the solver component 716 uses a mixed integer linear programming (MILP) approach to find the control plan. In general form, the objective function can be expressed as: minimize (or maximize) $Z=\Sigma_{j=1}^{n} c_j x_j$. The set of constraints to which the optimization is subject can be expressed as: $\Sigma_{j=1}^{n} a_{ij} x_j \geq b_i$, for i=1, 2, . . . , m. The symbols $c_j$, $a_{ij}$ and $b_i$ represent parameters, while the symbol $x_j$ represents decision variables, for which the solver component 716 attempts to find values. In one implementation, the solver component 716 can express the above problem using an object-oriented programming approach.

The solver component 716 operates by using the input data to supply the parameter values in the above equation, to the extent known. It then finds the values for the decision variables ($x_j$) which achieve the optimization objective. The solver component 716 can use known strategies to find its solution, such as the branch and cut technique. The branch and cut technique involves progressively narrowing down a search space to find the optimal solution; it does this by progressively adding nodes to a search tree (corresponding to a "branch" operation) while progressively removing ("cutting") nodes which cannot furnish the optimal solution because they produce out-of-range solutions.

The constraints in the constraint file 714 can take different forms for different physical environments, and with respect to different objective functions. To cite merely a few examples, the constraints for an office building can describe the amount of energy which its batteries can store, the rate at which the batteries can be charged, the individual or aggregated preferences of users in the building, the known effect of weather on heating and cooling requirements, the known effect of room occupancy on heating and cooling requirements, the known effect of weather on energy price, and so on. The solver component 716 uses the input data to instantiate these constraints. For example, assume that a hypothetical constraint formula specifies that, on winter afternoons when the sun is shining, a person's office temperature increases on average by 2° F. per hour for every occupant in the room, presuming that the office has south-facing windows. The solver component 716 can use the forecast occupancy data, forecast weather data, office orientation data, time data, etc. to determine how the temperature in a room will be affected in a time period under consideration. This instantiated relation constitutes just one of many constraints that affect the final control plan that is generated.

A first loop 718 indicates that the optimizing engine 130 can optionally repeat its operation for different objective functions. For example, in a first phase, the optimizing engine 130 can perform optimization to find a control plan that incurs the least amount of monetary cost. This may yield plural control plans which generally yield the same low cost. If so, in a second phase, the optimizing engine 130 can perform optimization to find the control plan, among the set of identified low cost control plans, that incurs the lowest negative impact on the environment, such as the plan which offers the smallest amount of carbon emissions. The optimizing engine 130 can perform the second phase by calculating the environmental impact of each low cost control plan, and then choosing the control plan which yields the smallest negative impact on the environment. Or the optimizing engine 130 can invoke the solver component 716 to search a general low-cost solution space defined by the first optimization, to find a control plan which yields the smallest negative impact on the environment. More generally, the optimizing engine 130 can perform the above-described staged processing for any number of phases, with each phase applying a different optimization function.

Note that FIG. 7 shows that the loop 718 feeds back into the forecasting engine 128. This is true when the next phase of optimization involves collecting new forecast data for use in its optimization operation. But the forecasting engine 128 can alternatively collect all the forecasting data it needs for all phases of optimization in one initial operation. In other cases, the next phase of optimization uses the same forecast data as the previous phase(s) of optimization, and thus there is no need to generate new forecast data.

A second loop 720 indicates that the optimizing engine 130 can optionally operate for different levels of analysis. For example, in a first phase, the optimizing engine 130 can determine a control plan which generally allocates a specified amount of the resource to a building as a whole for each hour of the next ten days (for example). The optimization objective at this stage may aim at economizing the cost of the resource for the building as a whole, while not exceeding the maximum capacity of the distribution substation. In the second phase, the optimizing engine 130 determines how to allocate the resource among the building's various spaces, such as its floors or rooms. To do so, the second phase accepts the control plan generated in the first phase as a fixed input constraint; that is, the control plan generated in the first phase fixes the total amount of power that the building has to allocate among its various spaces, for each hour of the day. More generally, the optimizing engine 130 can perform this multi-level processing for any number of levels of analysis associated with the physical environment 106.

In conclusion to Section A, the control system 104 offers various technical advantages. For instance, the control system 104 can generate a precise and nuanced control plan by virtue of its reliance on rich context information provided by the digital representation 126 of the physical environment 106. For instance, the control system 104 can take into account the manner in which users interact with spaces in the physical environment 106. Such insight is not captured by narrowly modeling an individual machine or process; this is because such a tactic ignores the context in which the machine or process is used in the physical environment 106.

According to another technical feature, the technique can quickly be applied to new physical environments without labor-intensive customization effort. The technique achieves this flexibility and scalability by providing a uniform framework for describing different types of environments, and through the use of the declarative-based solver component 716. More specifically, the uniform framework is attributed to the control system's use of the digital representation 126 of the physical environment 106. The declarative-based solver component 716 is scalable because it finds a solution which conforms to a set of low-level constraints without requiring a human analyst to manually develop a discrete set of rules or equations.

Specific use cases offer additional technical benefits. For example, the control system 104 can generate a control plan which avoids (or reduces) the consumption of power at times in which a distribution substation managed by a DSO may be handling high loads. This benefits both the consumer and DSO, e.g., by reducing the risk of a power outage. For instance, consider the case in which households served by the same distribution substation seek to charge their electric vehicles upon returning from work in the evening. This activity, performed in near-unison, will place a large load on the distribution substation that may exceed its capacity. This is because, historically, the distribution substation may not have been designed to accommodate a large number of customers who make large power demands of this nature. In aggregate, the control system 104 can operate to spread out this load by incentivizing households to charge their vehicles throughout the day. The control system 104 can further lower the cost of power delivered to any household which consumes power at non-peak times, presuming that the power is priced comparatively less at these times.

B. Illustrative Processes

FIGS. 8-10 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIGS. 8 and 9 show a process 802 that provides an overview of one manner of operation of the control system 104 of FIG. 6. In block 804, the control system 104 stores environment information 406 in one or more data stores (402, 404) that describes a physical environment 106 to be controlled, the environment information 406 including: first information which describes entities associated with the physical environment 106, the entities including at least: one or more physical spaces 116, one or more devices 118, one or more sensors 122, and one or more people 120 who interact with the physical environment 106; and second information which describes relations among the entities in the physical environment 106. In block 806, the control system 104 receives sensor data from one or more sensors 122 provided by the physical environment 106, the sensor data describing states associated with at least some of the physical entities in the physical environment 106. In block 808, the control system 104 generates forecast data, using at least one machine-trained model 706, which describes a future state of at least one aspect of the physical environment 106, the generating of forecast data being based at least on: the environment information 406; and the sensor data. In block 810, the control system 104 generates a control plan that provides a strategy for controlling operation of the devices 118 and/or other entities in the physical environment 106 that satisfies a specified optimization objective, within a specified span of time. The generating of the control plan is based at least on: a constraint file 714 that describes constraints associated with the physical environment 106; an objective function 712 that describes the optimization objective; the sensor data; and the forecast data.

Advancing to FIG. 9, in block 902, a bid-generating component 618 submits proposal information to a resource-providing system 108 that describes the control plan. In block 904, the bid-generating component 618 receives reply information from the resource-providing system 108 in response to the proposal information. In block 906, the control system 104 sends instructions to the physical environment 106 when the reply information indicates that the resource-providing system 108 has approved the proposal information, the instructions for use in controlling the devices 118 and/or other entities based on the control plan, e.g., by controlling consumption of a resource in the physical environment 106.

FIG. 10 shows a process 1002 that describes a tiered control strategy that can be employed by the control system 104 of FIG. 6. In block 1004, the control system 104 generates two or more initial control plans which satisfy a first sub-objective. In block 1006, the control system 104 chooses a control plan from the two or more initial control plans which most readily satisfies a next sub-objective. The inner loop 1008 indicates that the control system 104 can repeat this optimization operation for any number b of sub-objectives. The outer loop 1010 indicates that the control system 104 can repeat its multi-factor optimization (or single-factor optimization) for any number c of levels. In one approach, the control system 104 processes levels in a top-down fashion, e.g., by performing optimization at a parent node in a topology and then advancing to a child node, etc.

C. Representative Computing Functionality

Figure 11:
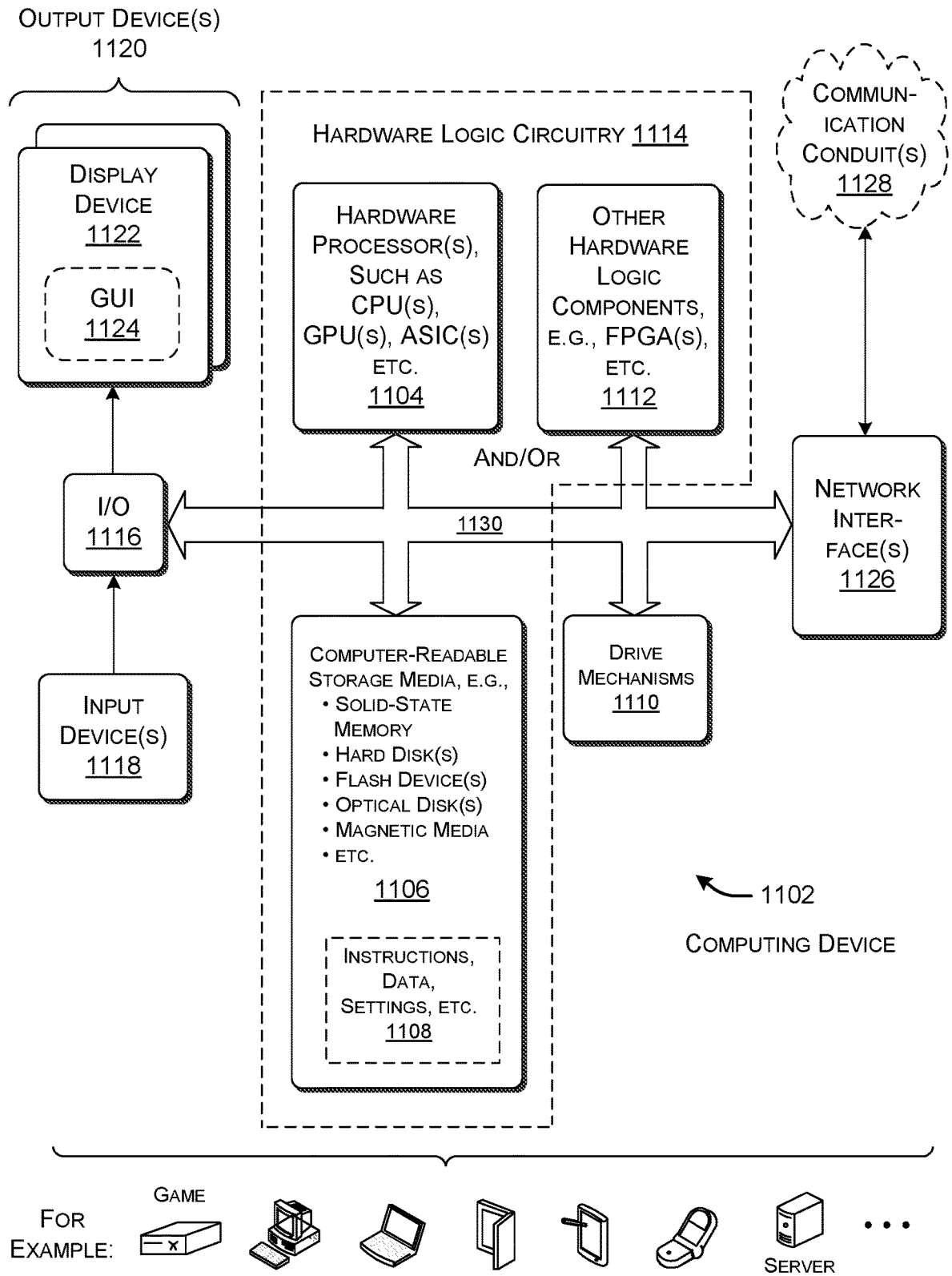
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, with reference to FIG. 6, the type of computing device 1102 shown in FIG. 11 can be used to implement any computing device associated with the control system 104, or the user device 602, etc. In all cases, the computing device 1102 represents a physical and tangible processing mechanism.

The computing device 1102 can include one or more hardware processors 1104. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable component of the computing device 1102. Further, any instance of the computer-readable storage media 1106 may provide volatile or non-volatile retention of information.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic components 1112 to perform operations using a task-specific collection of logic gates. For instance, the hardware logic component(s) 1112 may include a fixed configuration of hardware logic gates, e.g., that are created and set at the time of manufacture, and thereafter unalterable. Alternatively, or in addition, the other hardware logic component(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic component(s) 1112. That is, the computing device 1102 can employ any combination of the hardware processor(s) 1104 that execute machine-readable instructions provided in the computer-readable storage media 1106, and/or one or more other hardware logic component(s) 1112 that perform operations using a fixed and/or programmable collection of hardware logic gates. More generally stated, the hardware logic circuitry 1114 corresponds to one or more hardware logic components of any type(s) that perform operations based on logic stored in and/or otherwise embodied in the hardware logic component(s).

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described components together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units may correspond to discrete hardware units provided in a computing device chassis having any form factor. FIG. 11 shows illustrative form factors in its bottom portion. In other cases, the computing device 1102 can include a hardware logic component that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative aspects of the technology set forth herein.

According to a first aspect, one or more computing devices are described for controlling a physical environment. The computing device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include storing environment information in one or more data stores that describes the physical environment to be controlled. The environment information, in turn, includes: first information which describes entities associated with the physical environment, the entities including at least: one or more physical spaces, one or more devices, one or more sensors, and one or more people who interact with the physical environment; and second information which describes relations among the entities in the physical environment. The operations further include: receiving sensor data from one or more sensors provided by the physical environment, the sensor data describing states associated with at least some of the physical entities in the physical environment; generating forecast data, using at least one machine-trained model, that describes a future state of at least one aspect of the physical environment; generating a control plan that provides a strategy for controlling operation of the devices and/or other entities in the physical environment that satisfies a specified optimization objective, within a specified span of time; and sending instructions to the devices and/or other entities in the physical environment to control the operation of these devices and/or other entities based on the control plan. The generating of the forecast data is based at least on: the environment information; and the sensor data. The generating of the control plan is based at least on: a constraint file that describes constraints associated with the physical environment; an objective function that describes the optimization objective; the sensor data; and the forecast data.

According to a second aspect, the control plan influences load placed on a resource-providing system by the physical environment.

According to a third aspect, the physical environment corresponds to one or more buildings, or a part of a building.

According to a fourth aspect, the physical environment includes one or more local energy devices that are local to the physical environment which generate energy, and/or consume energy, and/or store previously-supplied energy. Here, the control plan controls operation of the one or more energy devices to achieve the optimization objective.

According to a fifth aspect, the optimization objective corresponds to optimization of at least one metric that measures an extent to which the physical environment consumes an externally-supplied resource during times designated as preferable.

According to a sixth aspect, dependent on the fifth aspect, a time is assessed as preferable in relation to an anticipated load at a resource-providing system which supplies the resource at that time.

According to a seventh aspect, the optimization objective corresponds to minimization of a specified negative environmental impact associated with consumption of a resource by the physical environment.

According to an eighth aspect, the optimization objective corresponds to optimization of at least one metric that describes efficiency with which a resource is consumed within the physical environment.

According to a ninth aspect, the optimization objective corresponds to maximization of at least one metric that describes user satisfaction within the physical environment.

According to a tenth aspect, the optimization objective includes at least a first and second sub-objectives. Here, the generating of the control plan includes: generating two or more initial control plans which satisfy the first sub-objective; and choosing a control plan from the two or more initial control plans which most readily satisfies the second sub-objective.

According to an eleventh aspect, dependent on the tenth aspect, the first sub-objective corresponds to optimization of at least one metric that measures an extent to which the physical environment consumes a resource during times designated as preferable, and the second sub-objective is minimization of a specified negative environmental impact associated with consumption of the resource by the physical environment.

According to a twelfth aspect, the operations further include: submitting proposal information to a resource-providing system that describes the control plan; receiving reply information from the resource-providing system in response to the proposal information; and sending the instructions to the physical environment when the reply information indicates that the resource-providing system has approved the proposal information.

According to a thirteenth aspect, dependent on the twelfth aspect, the resource-providing system is associated with a distribution system for distributing power to the physical environment.

According to a fourteenth aspect, the generating of forecast data includes: using a first machine-trained model to predict future presence of people within the physical environment; using a second machine-trained model to predict future consumption of a resource within the physical environment; and using a third-machine-trained model to predict future cost of the resource.

According to a fifteenth aspect, the generating of the control plan uses a solver component that operates using a mixed integer linear programming strategy.

According to a sixteenth aspect, a method is described, implemented by one or more computing devices, for controlling a physical environment. The method includes storing environment information in one or more data stores that describes the physical environment to be controlled. The environment information includes: first information which describes entities associated with the physical environment, the entities including at least: one or more physical spaces, one or more devices, one or more sensors, and one or more people who interact with the physical environment; and second information which describes relations among the entities in the physical environment. The method further includes: receiving sensor data from one or more sensors provided by the physical environment, the sensor data describing states associated with at least some of the physical entities in the physical environment; generating forecast data, using at least one machine-trained model, that describes a future state of at least one aspect of the physical environment; generating a control plan that provides a strategy for controlling operation of the devices and/or other entities in the physical environment that satisfies a specified optimization objective, within a specified span of time; submitting proposal information to a resource-providing system that describes the control plan; receiving reply information from the resource-providing system in response to the proposal information; and sending instructions to the physical environment when the reply information indicates that the resource-providing system has approved the proposal information, the instructions for use in executing the control plan in the physical environment. The generating of the forecast data is based at least on: the environment information; and the sensor data. The generating of the control plan is based at least on: a constraint file that describes constraints associated with the physical environment; an objective function that describes the optimization objective; the sensor data; and the forecast data.

According to a seventeenth aspect, dependent on the sixteenth aspect, the resource-providing system is a distribution system for distributing power to the physical environment.

According to an eighteenth aspect, dependent on the sixteenth aspect, the optimization objective corresponds to optimization of at least one metric that measures an extent to which the physical environment consumes an externally-supplied resource during times designated as preferable. A time is assessed as preferable in relation to an anticipated load at a resource-providing system which supplies the resource at that time.

According to a nineteenth aspect, dependent on the sixteenth aspect, the optimization objective includes at least a first and second sub-objectives. The generating of the control plan includes: generating two or more initial control plans which satisfy the first sub-objective; and choosing a control plan from the two or more initial control plans which most readily satisfies the second sub-objective.

According to a twentieth aspect, a computer-readable storage medium is described for storing computer-readable instructions. The computer-readable instructions, when executed by one or more hardware processors, perform a method that includes storing environment information in one or more data stores that describes a physical environment to be controlled. The environment information includes: first information which describes entities associated with the physical environment, the entities including at least one or more physical spaces, one or more devices, one or more sensors, and one or more people who interact with the physical environment; and second information which describes relations among the entities in the physical environment. The method further includes: receiving sensor data from one or more sensors provided by the physical environment, the current sensor data describing states associated with at least some of the physical entities in the physical environment; generating forecast data, using at least one machine-trained model, that describes a future state of at least one aspect of the physical environment; and generating a control plan that provides a strategy for controlling operation of the devices and/or other entities in the physical environment that satisfies a specified optimization objective, within a specified span of time. The physical environment includes one or more local energy devices that are local to the physical environment which generate energy, and/or consume energy, and/or store previously-supplied energy, and the control plan leverages the one or more local energy devices to achieve the optimization objective. The generating of the forecast data is based at least on: the environment information; and the sensor data. The generating of the control plan is based at least on: a constraint file that describes constraints associated with the physical environment; an objective function that describes the optimization objective; the sensor data; and the forecast data.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for controlling a physical environment, comprising:
   hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates, the operations including:
   storing environment information in one or more data stores that describes the physical environment to be controlled, the physical environment including plural local energy devices that generate energy, and/or consume energy, and/or store previously-supplied energy, the environment information including:
      first information which describes entities associated with the physical environment, the entities including at least: one or more physical spaces; one or more devices including said plural local energy devices; one or more sensors; and one or more people who interact with the physical environment; and
      second information which describes relations among the entities in the physical environment,
      the environment information being expressed as a data structure having nodes connected by links, the nodes representing the entities, and the links representing the relations among the entities;

receiving sensor data from one or more sensors provided by the physical environment, the sensor data describing states associated with at least some of the entities in the physical environment;

generating forecast data, using at least one machine-trained model, that describes a future state of at least one aspect of the physical environment, said generating of the forecast data being based at least on: the environment information; and the sensor data;

generating a control plan that provides a strategy for controlling operation of the plural local energy devices and/or other entities in the physical environment that satisfies a specified optimization objective, within a specified span of time, said generating of the control plan being based at least on: a constraint file that describes constraints associated with the physical environment, as expressed by properties of the nodes of the data structure; an objective function that describes the specified optimization objective; the sensor data; and the forecast data; and sending instructions to the plural local energy devices and/or other entities in the physical environment to control the operation of the plural local energy devices and/or other entities based on the control plan, wherein the specified optimization objective includes minimizing a cost incurred by the physical environment in consuming power in a flexibility market hosted by a distribution system operator, and wherein said generating of the control plan includes modeling said plural local energy devices in the physical environment as an aggregate flexible energy resource, the aggregate flexible energy resource being controlled to achieve the specified optimization objective.

2. The one or more computing devices of claim 1, wherein the specified optimization objective also includes minimization of a specified negative environmental impact associated with consumption of power by the physical environment.

3. The one or more computing devices of claim 1, wherein the specified optimization objective also includes optimization of at least one metric that describes efficiency with which power is consumed within the physical environment.

4. The one or more computing devices of claim 1, wherein the specified optimization objective also includes maximization of at least one metric that describes user satisfaction within the physical environment.

5. The one or more computing devices of claim 1, wherein the specified optimization objective includes at least a first and second sub-objectives, and wherein said generating of the control plan includes:

generating two or more initial control plans which satisfy the first sub-objective; and choosing a control plan from said two or more initial control plans which most readily satisfies the second sub-objective.

6. The one or more computing devices of claim 5, wherein the first sub-objective corresponds to said minimizing of the cost incurred by the physical environment in consuming power in the flexibility market, and the second sub-objective is minimization of a specified negative environmental impact associated with consumption of power by the physical environment.

7. The one or more computing devices of claim 1, wherein the operations further comprise:

submitting proposal information to a resource-providing system that describes the control plan;

receiving reply information from the resource-providing system in response to the proposal information; and sending the instructions to the physical environment when the reply information indicates that the resource-providing system has approved the proposal information.

8. The one or more computing devices of claim 1, wherein said generating of forecast data includes:

using a first machine-trained model to predict future presence of people within the physical environment;

using a second machine-trained model to predict future consumption of power within the physical environment; and using a third-machine-trained model to predict future cost of power.

9. The one or more computing devices of claim 1, wherein a particular node associated with a particular local energy device has a property that describes a maximum amount of energy the particular local energy device can store, and another property that describes a maximum rate of charging the particular local energy device.

10. The one or more computing devices of claim 1, wherein said generating of the control plan uses the data structure to obtain the sensor data and the forecast data.

11. The one or more computing devices of claim 1, wherein a particular node in the data structure is associated with a particular space in the physical environment having properties, the properties including one set of properties that describe physical characteristics of the particular space, another set of properties that describe a present state of the particular space, another set of properties that describes an anticipated future state of the particular space, and another set of properties that describes constraints associated with the particular space.

12. A method, implemented by one or more computing devices, a physical environment, comprising:

storing environment information in one or more data stores that describes the physical environment to be controlled, the physical environment including plural local energy devices that generate energy, and/or consume energy, and/or store previously-supplied energy, the environment information including:

first information which describes entities associated with the physical environment, the entities including at least: one or more physical spaces; one or more devices including said plural local energy devices; one or more sensors; and one or more people who interact with the physical environment; and second information which describes relations among the entities in the physical environment, the environment information being expressed as a data structure having nodes connected by links, the nodes representing the entities, and the links representing the relations among the entities;

receiving sensor data from one or more sensors provided by the physical environment, the sensor data describing states associated with at least some of the entities in the physical environment;

generating forecast data, using at least one machine-trained model, that describes a future state of at least one aspect of the physical environment, said generating of the forecast data being based at least on: the environment information; and the sensor data;

generating a control plan that provides a strategy for controlling operation of the plural local energy devices and/or other entities in the physical environment that satisfies a specified optimization objective, within a specified span of time, said generating of the control plan being based at least on: a constraint file that describes constraints associated with the physical environment, as expressed by properties of the nodes of the data structure; an objective function that describes the specified optimization objective; the sensor data; and the forecast data;

submitting proposal information to a resource-providing system that describes the control plan;

receiving reply information from the resource-providing system in response to the proposal information; and sending instructions to the physical environment when the reply information indicates that the resource-providing system has approved the proposal information, the instructions for use in executing the control plan in the physical environment, wherein the resource-providing system is a distribution system for distributing power to the physical environment, and wherein the specified optimization objective includes minimizing a cost incurred by the physical environment in consuming power from the distribution system in a flexibility market hosted by a distribution system operator, and wherein said generating of the control plan includes modeling said plural local energy devices in the physical environment as an aggregate flexible energy resource, the aggregate flexible energy resource being controlled to achieve the specified optimization objective.

13. The method of claim 12, wherein the specified optimization objective includes at least a first and second sub-objectives, and wherein said generating of the control plan includes:

generating two or more initial control plans which satisfy the first sub-objective, the first sub-objective corresponding to said minimizing of the cost incurred by the physical environment in consuming power in the flexibility market; and choosing a control plan from said two or more initial control plans which most readily satisfies the second sub-objective.

14. The method of claim 12, wherein a particular node associated with a particular local energy device has a property that describes a maximum amount of energy the particular local energy device can store, and another property that describes a maximum rate of charging the particular local energy device.

15. The method of claim 12, wherein said generating of the control plan uses the data structure to obtain the sensor data and the forecast data.

16. The method of claim 12, wherein a particular node in the data structure is associated with a particular space in the physical environment having properties, the properties including one set of properties that describe physical characteristics of the particular space, another set of properties that describe a present state of the particular space, another set of properties that describes an anticipated future state of the particular space, and another set of properties that describes constraints associated with the particular space.

17. A computer-readable storage medium for storing computer-readable instructions, the computer-readable instructions, when executed by one or more hardware processors, performing a method that comprises:

storing environment information in one or more data stores that describes a physical environment to be controlled, the physical environment including plural local energy devices that generate energy, and/or consume energy, and/or store previously-supplied energy, the environment information including:

first information which describes entities associated with the physical environment, the entities including at least: one or more physical spaces; one or more devices including said plural local energy devices; one or more sensors; and one or more people who interact with the physical environment; and second information which describes relations among the entities in the physical environment, the environment information being expressed as a data structure having nodes connected by links, the nodes representing the entities, and the links representing the relations among the entities;

receiving sensor data from one or more sensors provided by the physical environment, the current sensor data describing states associated with at least some of the entities in the physical environment;

generating forecast data, using at least one machine-trained model, that describes a future state of at least one aspect of the physical environment, said generating of the forecast data being based at least on: the environment information; and the sensor data; and generating a control plan that provides a strategy for controlling operation of the plural local energy devices and/or other entities in the physical environment that satisfies a specified optimization objective, within a specified span of time, said generating of the control plan being based at least on: a constraint file that describes constraints associated with the physical environment, as expressed by properties of the nodes of the data structure; an objective function that describes the specified optimization objective; the sensor data; and the forecast data, wherein the specified optimization objective includes minimizing a cost incurred by the physical environment in consuming power in a flexibility market hosted by a distribution system operator, and wherein said generating of the control plan includes modeling said plural local energy devices in the physical environment as a flexible aggregate energy resource, the aggregate flexible energy resource being controlled to achieve the specified optimization objective.

18. The computer-readable storage medium of claim 17, wherein a particular node associated with a particular local energy device has a property that describes a maximum amount of energy the particular local energy device can store, and another property that describes a maximum rate of charging the particular local energy device.

19. The computer-readable storage medium of claim 17, wherein said generating of the control plan uses the data structure to obtain the sensor data and the forecast data.

20. The computer-readable storage medium of claim 17, wherein a particular node in the data structure is associated with a particular space in the physical environment having properties, the properties including one set of properties that describe physical characteristics of the particular space, another set of properties that describe a present state of the particular space, another set of properties that describes an anticipated future state of the particular space, and another set of properties that describes constraints associated with the particular space.

* * * * *